United States Patent Office 3,373,982
Patented Mar. 19, 1968

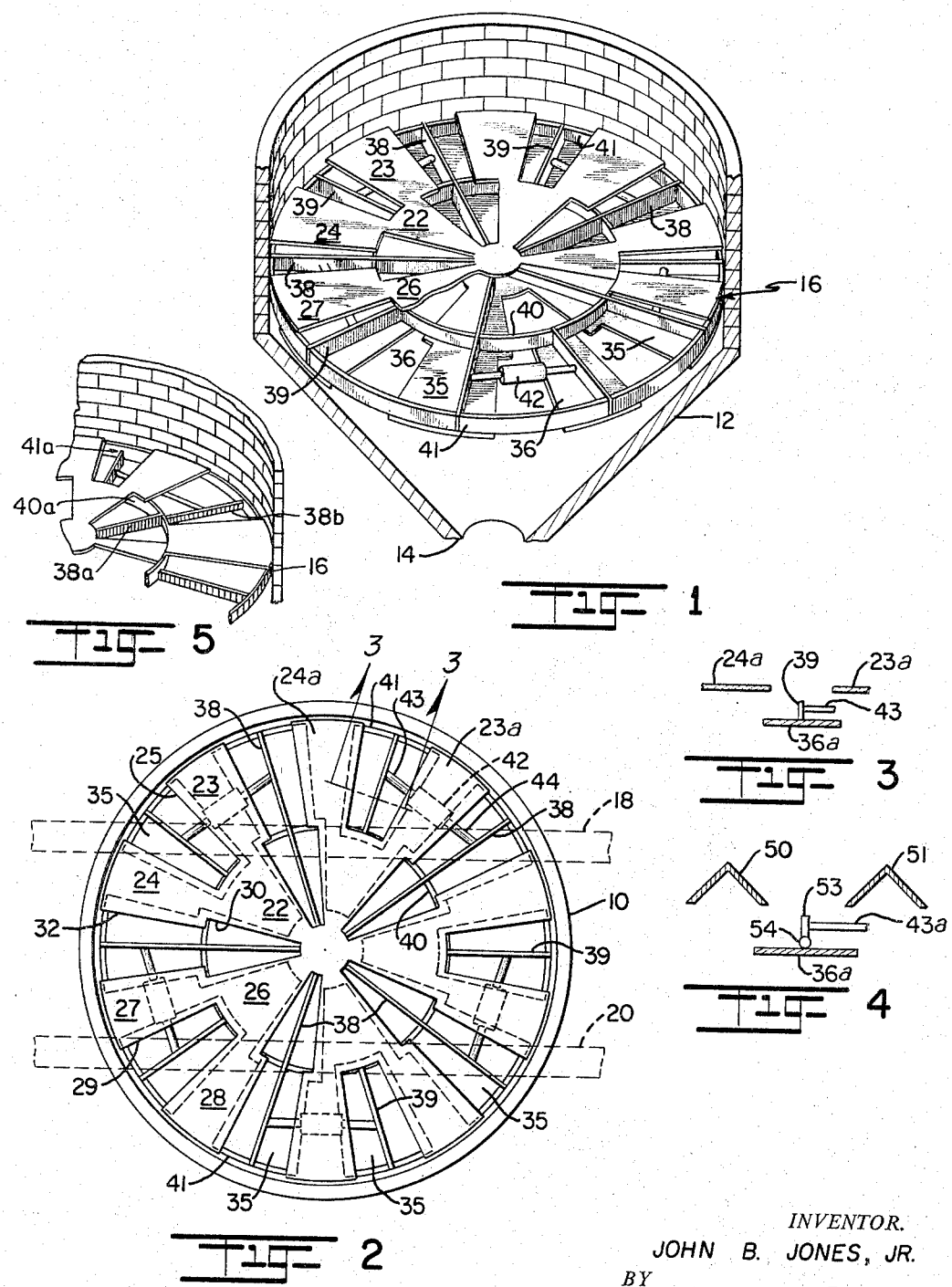

3,373,982
RADIAL GRATE FOR SHAFT KILNS
John B. Jones, Jr., Denver, Colo., assignor, by direct and mesne assignments, to The Battelle Development Corporation, Columbus, Ohio, a corporation of Delaware
Filed Oct. 20, 1965, Ser. No. 498,891
9 Claims. (Cl. 263—29)

ABSTRACT OF THE DISCLOSURE

A discharge mechanism for shaft furnaces having narrow, concentric radial openings extending outwardly from the furnace center, with a retarder plate mounted under each opening, to prevent direct vertical movement of material, and an oscillating pusher bar is mounted on each retarder plate in close proximity to the edges of the openings pushes material from both sides of the plate, discharging it from the furnace. Each opening has radially directed side edges so that oscillation of the pusher bar pushes material uniformly from each plate, providing uniform flow of material across the lateral extent of the furnace.

---

This invention relates to improvements in shaft kilns and particularly to the discharge grate for such units.

Diverse types of industry utilize one type of process equipment which is an upright vessel commonly called shaft or vertical kilns, shaft furnaces, shaft generators, and the like, depending on the type of treatment and the material being treated. Such vessels may have a longer vertical extent than their cross-sectional dimensions but all rely on a gravity movement of pulverulent material through the vessel. Such vessels have been found useful for burning or calcining lime, coking coal, burning magnesite, dolomite, etc. The equipment commonly includes a circular cross-section, vertical vessel having means for uniformly feeding granular or pulverulent material across its lateral extent, a lower discharge means for uniformly discharging material across the lateral extent of the kiln, and means for introducing at least one stream of treating gas or fluid into some portion of the pulverulent material. As the cross-sectional dimensions of such equipment increase, considerable problems occur in attempting to uniformly discharge material from the contained mass so as to provide uniform movement through the kiln and a uniform treatment of all of the material as it passes through the kiln.

It is, therefore, an object of the invention to provide apparatus for uniformly removing solids from the lower portion of shaft vessels so as to provide a uniform movement of the solids across the lateral extent of such kilns.

Another object of the invention is to provide discharge apparatus for shaft kilns which is arranged to distribute treatment fluids uniformly throughout the lateral extent of the kiln for passage through the contained material.

Another object of the invention is to provide a kiln-contained discharge grate and operating mechanism for shaft kilns.

These and other objects and adavntages of the invention may be readily ascertained by referring to the following description and appended illustrations in which:

FIG. 1 is a diagrammatic, perspective view of a grate for a shaft kiln according to the invention;

FIG. 2 is a top plan view of the grate of FIG. 1;

FIG. 3 is an enlarged detail, in cross-section, of one form of a discharge grate according to the invention;

FIG. 4 is a detailed cross-sectional view of a modified form of the grate according to the invention; and FIG. 5 is a partial perspective view of a grate, according to the invention, showing the reduction in height of the pusher bar from the central section to the concentric section.

In general, the grate of the invention provides a means for supporting a load of pulverulent material in a vertical vessel of a circular cross-section, such as a shaft kiln, and the grate provides means for discharging material from the load at a predetermined rate. The grate provides a central circular portion with discharge openings, and at least one annular portion around the central portion with discharge openings. The total area of the openings in the annular portion is substantially more than the central portion. When the radial dimension of both portions is about equal, approximately twice the area of openings is needed for the annular area to provide uniform discharge of the material.

The design of the grate is arranged as a volumertic discharge mechanism, and pushers control the flow of solids through the grate so as to provide a uniform movement of the contained solids across the lateral extent of the kiln. The uniform rate of flow of solids across the lateral extent of the kiln is determined by the positioning and geometry of the openings in the kiln as well as the movement and positioning of the pushers which extend radially outwardly from the central point in the kiln.

In the device illustrated, a vertical circular wall 10 is constructed of material necessary to contain the material under treatment. In the case of a kiln the material is refractory or the like. A conical bottom 12 is provided closing the lower end of the vessel with a central outlet 14 at the cone apex. The height of the vessel (above the grate) is determined by the treatment desired and is well known in the art. Additionally, feed apparatus for the device is well known in the art. The lower outlet 14 may be closed and fluid may be passed into the cone below the grate so that it passes through the carried load. A grate, shown in general by numeral 16, is mounted in the lower part of the kiln 10, and it is composed of a set of spaced apart plates having staggered openings to prevent direct gravity discharge along vertical lines. The grate structure may be mounted on support beams 18 and 20, shown in dashed lines in FIG. 2 for clarity, which pass through the conical member 12. The beams may, therefore, support the weight of the grate as well as the carried load on the grate. The use of I-beams and the like is well known for such purposes and does not form a part of this invention. The grate includes an upper deflecting plate member and a lower retaining plate member, with pushers mounted on the lower retaining plate member for pushing material therefrom into the conical base 12. The central circular portion of the deflector member, shown in FIG. 2, includes a series of triangular shaped openings, member 30 indicating one opening, leaving a deflector portion 22 connected to an outwardly extending portion 23 in the outer annular portion, and another similar outwardly extending portion 24 spaced therefrom providing an opening 25 therebetween. The adjacent section of the deflector includes a deflector portion 26 in the central portion connected to two spaced apart outer portions 27 and 28 leaving an opening 29 therebetween. A triangular shaped opening 30 with its edge in essentially one plane as shown in FIG. 2 is left between the two deflector portions 22 and 26, and an opening 32 remains between deflectors 24 and 27. Thus, it will be seen that there are five openings and five deflectors in the center portion of the plate and ten openings and ten deflectors in the outer portion of the deflector plate with each opening having its edge therearound in essentially one plane. A retainer plate 35 which is circular and has a series of cut-out portions, explained below, is mounted below the deflector plate. The retainer plate is arranged to provide a portion under each opening in the deflector with the edges thereof under the deflector to prevent a direct vertical passage through the grate. An aperture or opening in the retainer plate is provided under each one of the deflector plates mounted thereabove. In the case of the retainer plate, elongated shaped section 35 extends from the center of the kiln to about the wall. Wedge-shaped openings are provided below the deflector portions above the retainer plate. Thus, there is an opening below deflector portions and a retainer plate portion below the openings in the deflector plate.

A series of radial pushers are pivotally attached about a central pivot fastening means (not shown) centrally of the kiln. As shown in FIG. 2, radial pushers 38 extend from the kiln wall to the pivot point at the kiln center, and short pushers 39 extend from about the kiln wall to an intermediate retainer ring 40 between the central section and the annular section. These are alternately spaced around the kiln grate so that a pusher bar is positioned in each of the openings in the diverter plate for discharge of material on movement. The outer ends of the pushers are mounted on an outer ring 41 in addition to the ring 40 to provide stability of the pushers. The pushers may be actuated by means of a hydraulic cylinder 42, or other actuating mechanism for pivoting the same around the central pivot point. The hydraulic lines for fluid or electric leads for electric motors, etc. are not shown for drawing clarity. An hydraulic cylinder is an effective actuator since it may be attached between two pushers (with a lost motion connection to permit minor alignment correction). The actuation of the cylinders oscillate the pushers in a radial pivoting movement across the opening under which they are residing. The actuator 42 is provided with a piston rod 43 attached to a short pusher 39 and the opposed piston rod 44 is attached to next adjacent long pusher bar 38. As shown in FIG. 2, five actuators are provided to all of the pusher rods, and all of the actuators are arranged to move simultaneously to move all the pusher bars simultaneously. However, the bars may be operated in sets or independently depending on operating characteristics. The retainer plates are mounted below the divider plates, a sufficient distance to permit the pushers to pass therebetween, and usually sufficient to prevent the larger lumps of the pulverulent material from bridging across the openings therebetween.

In operation of the structure, pulverulent solids which have been fed into the kiln pass downwardly in the openings in the flow divider plate and rest on the retarder plates therebelow. The solids are then discharged from the vessel by actuating the actuators to move the pushers radially back and forth on the lower retainer plates.

The detail shown in FIG. 3 shows the positioning of the divider plates and the retainer plates mounted therebelow. The divider plates 23a and 24a are flat plates and are mounted spaced apart with a retainer plate 36a mounted therebelow. The pusher bar 39 is resting on the retainer plate 36 actuated by the push rod 43 from an actuator for moving solid material from the plate. In certain cases, it may be desirable to place the various divider plates and their juxtaposed retainer plates at different elevations, for example, it may be advantageous to have the outside grate section at a different elevation from the inner grate section.

In the modification illustrated in FIG. 4, diverter plates 50 and 51 are angles rather than flat plates as illustrated above, and these plates are juxtaposed above a retainer plate 36a. In some instances, it may be desirable to have the angular plates extending radially from the center to the wall of the kiln, and in other instances it may be advantageous to have the central flat plates and angular outer plates, or vice versa. A pusher bar 53 is mounted on rollers 54 on the plate 36a and a push rod 43a actuated by an actuator oscillates the pusher back and forth on the plate below the diverter plates 50 and 51. In this modification, it may, also, be advantageous to have the various diverter plates at different elevations across the extent of the kiln to provide various configurations according to the material being treated.

Where it is desired to contact the moving bed of pulverulent solids in the vessel with fluids, a seal may be placed over the bottom opening 14 and the fluids injected into the conical bottom 12. In addition, conduits or the like may be extended through the wall of a kiln beneath the diverter plates whether they are flat or angular and either by providing holes through the diverter plates or letting the fluids pass around the edges of the plates, the fluids may be injected into the bed of solids. When fluid is injected into the conical bottom for passage up through the grate and into the moving bed, the dimensional ratio of the relationships of the openings through grates are controlled so that the velocity through the smaller of the openings is sufficient to give a uniform fluid flow throughout the mass of material in the vessel. Where co-current contacting of fluids and solids is desired, both may be fed into the top of the vessel and the fluids either removed above or below the grate with shed-type collectors for separating the fluid from the solids. As pointed out above, where the treatment is a burning or flame treatment of a solid it may be desirable to bring one of the gaseous components for combustion through the grate and into the moving mass. Other portions of the gaseous component may be injected into the moving bed above the grate depending on the treatment.

With smaller diameter kilns, a single, circular configuration of openings in the grate may be satisfactory. As the diameter of the vessel increases, it may be necessary to increase the number of circular opening components. As shown in FIG. 2, two sets of openings are provided in the grate, i.e., an inner set and an outer set. When the vessel diameter increases still further it may be necessary to add still other sets of openings in annular configuration generally concentrically. When more than one series of openings is provided the height of the pushers on the outer series normally is reduced, since the number of openings is normally increased. As shown in FIG. 5, a pusher bar has an inner section 38a and a reduced height outer section 38b. The pusher bar is mounted on an inner support ring 40a and an outer support ring 41a. As additional sections are needed due to an increase in diameter of kiln, the pusher bar for each section is further reduced in height. The decrease in height of the pushers should be proportional to the change in the number of pushers and the area of the openings so as to maintain a uniform flow of solids through the kiln and particularly to maintain a uniform flow of material through a cross-section of the kiln. The formula for determining the height of the pusher bar for each section is:

$HNK=C$ where
H is the height of the pushers at each section
N is the number of pushers in the section
K is the volumetric efficiency factor
C is a constant.

As shown in FIG. 5, the height of the pusher 38b is approximately ½ of the height of pusher 38a since there are twice as many pushers in the outer section as in the inner section. K and C are determined for each kiln.

While the invention has been illustrated with reference to a particular embodiment, there is no intent to limit the spirit or scope of the invention to the precise details so set forth except as defined in the following claims.

I claim:

1. Grate means for a vertical, circular vessel having an upstanding wall comprising radially directed diverter means mounted adjacent the lower end of said vessel, said diverter means providing at least two portions across the lateral extent of said vessel, one portion being a central circular area and at least one annular portion contiguous and concentric with said central portion, there being a first series of spaced apart, radially directed openings in said diverter means in said central portion from adjacent the center to the edge thereof and there being a second series of spaced-apart radially directed openings in said concentric portion, each said opening having an edge therearound in substantially one plane, and the total area of the openings in said at least one concentric portion being substantially greater than the total area of the openings in said central portion; retarder plate means inclusive of radially directed side edges mounted below and spaced from each said opening with said radially directed edges extending underneath the edges of said radially directed openings to prevent direct vertical passage of material therethrough; pusher bar means mounted on a central pivot and extending radially outwardly mounted on said retarder plate means and arranged with one pusher bar below each said opening, each said pusher bar being a narrow bar substantially less in width than the opening with which it is associated, each said bar being mounted in close proximity to said edge in one plane around each said opening, said pusher bar means including annular tie rods securing said bars together for conjoint movement thereof; and means for oscillating said pusher bars about said pivot point and back and forth across each adjacent opening to sweep said retarder plates for discharge of held material over said radially directed edges.

2. Grate means according to claim 1 wherein said diverter means are flat plates.

3. Grate means according to claim 1 wherein said diverter means are angles.

4. Grate means according to claim 1 wherein said means for oscillating said pusher bars are hydraulic cylinders mounted below said diverter means at spaced intervals arounds the extent of said annular portion.

5. Grate means according to claim 1 wherein said pusher bar means include a number extending from about the pivot point of the wall of said vessel and a number extending only through said annular section.

6. Grate means according to claim 1 wherein said retarder plate means is a circular, generally flat member with openings therein spaced below said retarder means.

7. Grate means according to claim 1 wherein the height of the pusher bar is decreased in each portion extending outwardly from the center thereof.

8. Grate means according to claim 7 wherein the decrease of height of the pusher bar means in each portion is proportional to the change in number of pushers and the area of the openings therein so as to maintain a uniform flow of solids through the vessel in which it is mounted.

9. Grate means for a vertical, circular vessel having an upstanding outer wall comprising radially directed diverter means mounted adjacent the lower end of said vessel, said diverter means providing at least one portion across the lateral extent of the vessel and being a circular area including a series of spaced-apart radially directed openings from adjacent the center to the edge thereof, each said opening having an edge therearound in substantially one plane and each inclusive of a pair of radially directed side edges; retarder plate means inclusive of radially directed side edges mounted below and spaced from each said opening with said radially directed edges extending underneath the edges of the radially directed openings to prevent direct vertical passage of material therethrough; pusher bar means mounted on a central pivot and extending radially outwardly mounted on said retarder plate means and arranged with one pusher bar below each said opening, each said pusher bar being a narrow bar substantially less in width than the opening with which it is associated, each said pusher bar being mounted in close proximity to said edge in one plane around each said opening, said pusher bar means including means securing said bars together for conjoint movement thereof; and means for oscillating said pusher bars about said pivot and back and forth across each adjacent opening to sweep said retarder plates for discharge of held material over said radially directed edges.

References Cited

UNITED STATES PATENTS

| | | | |
|---|---|---|---|
| 2,148,946 | 2/1939 | Hubman et al. | 34—167 X |
| 3,027,147 | 3/1962 | Brakel et al. | 263—29 |
| 3,064,960 | 11/1962 | Beckenbach | 263—29 |
| 3,202,405 | 8/1965 | Stanley | 263—29 |

FREDERICK L. MATTESON, JR., *Primary Examiner.*

JOHN J. CAMBY, *Examiner.*